US007997415B2

(12) United States Patent
Mongan et al.

(10) Patent No.: US 7,997,415 B2
(45) Date of Patent: Aug. 16, 2011

(54) APPARATUS, METHOD AND SYSTEM FOR CREATING, COLLECTING AND INDEXING SEED PORTIONS FROM INDIVIDUAL SEED

(75) Inventors: Joshua L. Mongan, St. Charles, IA (US); Jason Cope, Ankeny, IA (US); Gary A. Sandahl, West Des Moines, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 20 days.

(21) Appl. No.: 12/545,286

(22) Filed: Aug. 21, 2009

(65) Prior Publication Data

US 2010/0047912 A1 Feb. 25, 2010

Related U.S. Application Data

(60) Provisional application No. 61/090,975, filed on Aug. 22, 2008.

(51) Int. Cl.

| | |
|---|---|
| ***B03C 1/00*** | (2006.01) |
| ***B65G 47/24*** | (2006.01) |
| ***B65G 15/58*** | (2006.01) |
| ***B65G 21/00*** | (2006.01) |
| ***B65G 39/08*** | (2006.01) |
| ***B65G 41/00*** | (2006.01) |

(52) U.S. Cl. ..................... 209/213; 209/223.1; 198/381; 198/690.1

(58) Field of Classification Search ........................ None
See application file for complete search history.

(56) References Cited

U.S. PATENT DOCUMENTS

| | | | | |
|---|---|---|---|---|
| 2,675,942 A | | 4/1954 | Voglesang | |
| 4,454,829 A | | 6/1984 | Sena | |
| 4,504,505 A | * | 3/1985 | Rodriguez et al. | 426/482 |
| 4,947,579 A | | 8/1990 | Harrison et al. | |
| 7,502,113 B2 | | 3/2009 | Deppermann et al. | |
| 7,591,101 B2 | | 9/2009 | Deppermann | |
| 7,611,842 B2 | | 11/2009 | Deppermann et al. | |
| 7,703,238 B2 | | 4/2010 | Deppermann et al. | |
| 7,735,626 B2 | * | 6/2010 | Cope et al. | 198/381 |
| 7,767,883 B2 | | 8/2010 | Deppermann et al. | |
| 2006/0046244 A1 | | 3/2006 | Deppermann | |
| 2007/0207485 A1 | | 9/2007 | Deppermann et al. | |
| 2008/0131254 A1 | * | 6/2008 | Cope et al. | 414/754 |
| 2008/0317279 A1 | | 12/2008 | Deppermann et al. | |
| 2009/0215060 A1 | | 8/2009 | Deppermann et al. | |
| 2009/0252880 A1 | | 10/2009 | Kurth | |
| 2010/0044356 A1 | * | 2/2010 | Cope | 219/121.67 |
| 2010/0050300 A1 | * | 2/2010 | Cope | 800/298 |

FOREIGN PATENT DOCUMENTS

EP 0 373 872 A1 6/1990

OTHER PUBLICATIONS

International Search Report and Written Opinion for Appl. No. PCT/US2009/054658 mailed Apr. 5, 2010.

* cited by examiner

*Primary Examiner* — Stefanos Karmis
(74) *Attorney, Agent, or Firm* — Alston & Bird LLP

(57) ABSTRACT

A method, apparatus, and system for coating, singulating, aligning, ablating, and indexing a number of seeds for testing is described. The apparatus has a carrier designed to hold seeds in a predetermined alignment for ablating a seed sample from a seed portion, the seed portions are indexed to the seed samples. The carrier is then located on the apparatus which delivers the seed samples from the carrier to a collector for laboratory testing.

25 Claims, 14 Drawing Sheets

APPARATUS, METHOD AND SYSTEM FOR CREATING, COLLECTING AND INDEXING SEED PORTIONS FROM INDIVIDUAL SEED

RELATED APPLICATIONS

This application claims priority under 35 U.S.C. §119 to provisional application Ser. No. 61/090,975 filed Aug. 22, 2008, which application is hereby incorporated by reference in its entirety.

FIELD OF THE INVENTION

The present invention relates generally to an apparatus, method and system for creating, collecting and indexing seed portions from individual seed in an efficient way.

BACKGROUND OF THE INVENTION

It is conventional practice in plant breeding or plant advancement experiments to grow plants from seed of known parentage. The seed are planted in experimental plots, growth chambers, greenhouses, or other growing conditions in which they are either cross pollinated with other plants of known parentage or self pollinated. The resulting seed are the offspring of the two parent plants or the self pollinated plant, and are harvested, processed and planted to continue the plant breeding cycle. Specific laboratory or field-based tests may be performed on the plants, plant tissues, seed or seed tissues, in order to aid in the breeding or advancement selection process.

Generations of plants based on known crosses or self pollinations are planted and then tested to see if these lines or varieties are moving towards characteristics that are desirable in the marketplace. Examples of desirable traits include, but are not limited to, increased yield, increased homozygosity, improved or newly conferred resistance and/or tolerance to specific herbicides and/or pests and pathogens, increased oil content, altered starch content, nutraceutical composition, drought tolerance, and specific morphological based trait enhancements.

As can be appreciated and as is well known in the art, these experiments can be massive in scale. They involve a huge labor force ranging from scientists to field staff to design, plant, maintain, and conduct the experiments, which can involve thousands or tens of thousands of individual plants. They also require substantial land resources. Plots or greenhouses can take up thousands of acres of land. Not only does this tie up large amounts of land for months while the plants germinate, grow, and produce seed, during which time they may be sampled for laboratory or field testing, but then the massive amounts of seed must be individually tagged, harvested and processed.

A further complication is that much of the experimentation goes for naught. It has been reported in literature that some seed companies discard 80-90% of the plants in any generation early on in the experiment. Thus, much of the land, labor and material resources expended for growing, harvesting, and post-harvest processing ultimately are wasted for a large percentage of the seed.

Timing pressures are also a factor. Significant advances in plant breeding have put more pressure on seed companies to more quickly advance lines or varieties of plants for more and better traits and characteristics. The plant breeders and associated workers are thus under increasing pressure to more efficiently and effectively process these generations and to make more and earlier selections of plants which should be continued into the next generation of breeding.

Therefore, a movement towards earlier identification of traits of interest through laboratory based seed testing has emerged. Seed is non-destructively tested to derive genotypic information. If traits of interest are identified, the selected seed from specific plants are used either for further experiments and advancement, or to produce commercial quantities. Testing seed prevents the need to grow the seed into immature plants, which are then tested. This saves time, space, and effort. Effective, early identification of desirable traits in seed can lead to greatly reducing the amount of land needed for experimental testing, the amount of seed that must be tested, and the amount of time needed to derive the information needed to advance the experiments. For example, instead of thousands of acres of plantings and the subsequent handling and processing of all those plants, a fraction of acres and plants might be enough. However, because timing is still important, this is still a substantial task because even such a reduction involves processing, for example, thousands of seed per day.

A conventional method of attempting non-lethal seed sampling is as follows. A single seed of interest is held with pliers above a sheet of paper laid out on a surface. A small drill bit is used to drill into a small location on the seed. Debris removed by the drill bit from the seed is collected on the sheet of paper. The paper is lifted and the debris is transferred to a test tube or other container. The debris is thus collected and ready for laboratory analysis. The seed is stored in another container. The two containers, housing the seed and sample, are indexed or correlated for tracking purposes. This method is intended to be non-lethal to the seed. However, the process is slow. Its success and effectiveness depends heavily on the attention and accuracy of the worker. Each single seed must be manually picked up and held by the pliers. The drilling is also manual. Care must be taken with the drilling and the handling of the debris, as well as insuring that the full sample amount is transferred into a container and the seed from which the sample was taken into another container. These two containers, e.g. the individual test tubes, must then be handled and marked or otherwise tracked and identified. Additionally, the pliers and drill must be cleaned between the sampling of each seed. There can be substantial risk of contamination by carry-over from sample to sample and the manual handling. Also, many times it is desirable to obtain seed material from a certain physiological tissue of the seed. For example, with corn seed, it may be desirable to take the sample from the endosperm. In such cases, it is not trivial, but rather time-consuming and somewhat difficult to manually grasp a small corn seed is such a way to allow the endosperm to be oriented to expose it for drilling. Sampling from other seed structures such as the seed germ must be avoided because sampling from such regions of the seed negatively impacts germination rates. Sometimes it is difficult to obtain a useful amount of sample with this method. In summary, sampling from seed relies heavily on the skill of the worker and is relative to throughput and accuracy, including whether the procedure gives the seed a good chance at germination. These issues are amplified when a worker is charged with processing many seed a day.

As evidenced by these examples, present conventional seed analysis methods, such as is used in genotypic analysis, require at least a part of the seed to be removed and processed. In removing a portion of the seed, various objectives may need to be met. These may include one or more of the following objectives:

(a) maintain seed viability post-sampling if required;

(b) obtain at least a minimum required sample amount, without affecting viability;

(c) obtain a sample from a specific location on the seed, often requiring the ability to efficiently position and orient the seed in a specific position and orientation for sampling;

(d) maintain a particular throughput level for efficiency purposes;

(e) reduce or virtually eliminate contamination between samples;

(f) maintain an efficient and controlled post-sampling handling regimen and environment to move and collect seed portion and seed after sampling; and (g) allow for the tracking of separate samples and their correlation to other samples in a group.

(a) Viability

With regard to maintaining seed viability, it may be critical in some circumstances that the seed sampling method and apparatus not damage the seed in such a way that seed viability is reduced. It is often desirable that such analysis be non-lethal to the seed, or at least result in a substantial probability that the sampled seed will germinate (e.g. no significant decrease in germination potential) so that it can be grown into a mature plant. For some analyses, seed viability does not need to be maintained, in which case larger samples can often be taken. The need for seed viability will depend on the intended use of the seeds post-sampling. Therefore, there is a need to preserve the viability of the seed by providing seed sampling and handling apparatus, methods and systems of the present invention.

(b) Sample Amount

It is desirable to obtain a useful amount of sample. To be useful, in some applications it must be above a certain minimum amount necessary in order to perform a given test and obtain a meaningful result. Different tests or assays require different sample amounts. It may be equally important to avoid taking too much tissue for a sample, because a sample that is too large may reduce germination potential of a seed, which may be undesirable. Therefore, it is desirable that sampling apparatus, methods and systems allow for variation in the amount of sample taken from any given seed.

(c) Sample Location

A useful sample amount also can involve sample location accuracy. For example, in some applications the sample must come only from a certain location or from certain tissue. Further, it is difficult to handle small seed. It is also difficult to accurately position and orient seed. On a corn seed, for example, it may be important to sample the endosperm tissue, and orient the corn seed for sampling that particular tissue. Therefore, it is desirable that the sampling apparatus, methods and systems are adapted to allow for high throughput seed positioning and orientation of seed for location-specific sampling, which may include seed orientation apparatuses, methods and systems with geometries, architecture and steps adapted to position and orient seed in a predetermined orientation.

(d) Throughput

A sampling apparatus and methodology must consider the throughput level that supports the required number of samples being taken in a time efficient manner. For example, some situations involve the potential need to sample thousands, hundreds of thousands, or even millions of seed per year. Taking the hypothetical example of a million seed per year, and a 5-day work week, this would average nearly four thousand samples per day for each working day of a year. It is difficult to meet such demand with lower throughput sampling methods. Accordingly, higher throughput, automatic or even semi-automatic apparatuses, methods and systems are desirable.

(e) Avoiding Contamination

It is desirable that a sampling methodology, system and apparatus not be prone to cross-contamination in order to maintain sample purities for subsequent analytical testing procedures. This can involve not only sample location accuracy, such that a sample from a given location is not contaminated with tissue from a different location, but also the method of sampling and the handling of each individual sample, ensuring no contamination between samples.

(f) Handling (Post-Sampling)

With higher throughput as an objective, it is important that consideration be given to maintaining an efficient and controlled post-sampling handling regimen and environment to move and collect the seed portion and seed after sampling. Such post-sampling operations should ensure each operation is devoid of contamination. Depending on the tool used to remove a portion of the seed, such as a laser, further consideration need to be given to how the seed and seed portion are handled and collected to insure viability is preserved, contamination is limited, and accurate high throughput separation of seed and seed portions is maintained.

(g) Indexing (Tracking) Sample and Sampled Seed

Efficient processing of seed and samples removed from seed presents a variety of issues and challenges, especially when it is important to keep track of each seed, each sample, and their correlation to each other, or to other samples. Accordingly, it is desirable that sampling apparatus, methods and systems allow for easy tracking and correlation of seed and their samples.

Conventional seed sampling technologies do not address these requirements sufficiently, resulting in pressures on capital and labor resources, and thus illustrate the need for an improvement in the state of the art. The current apparatuses, methods and systems are relatively low throughput, have substantial risk of cross-contamination, and tend to be inconsistent because of a reliance on significant manual handling, orienting, removal, post-handling, tracking and correlation of the sample and the seed. This can affect the type of sample taken from the seed and the likelihood that the seed will germinate. There is a need to eliminate the resources current methods require for cleaning between samples. There is a need to reduce or minimize cross-contamination between samples by carry-over or other reasons, or any contamination from any source of any sample. There is also a need for more reliability and accuracy. There is a further need to provide high throughput handling means for the seed and seed part. Accordingly, there is a need for methodologies and systems and their corresponding apparatuses which provide for seed sampling that accomplishes one or more of the following objectives:

(a) maintain seed viability post-sampling if required;

(b) obtain at least a minimum required sample amount, without affecting viability;

(c) obtain a sample from a specific location on the seed, often requiring the ability to efficiently position and orient the seed in a specific position and orientation for sampling;

(d) maintain a particular throughput level for efficiency purposes;

(e) reduce or virtually eliminate contamination between samples;

(f) maintain an efficient, high throughput and controlled post-sampling handling regimen and environment to move and collect the seed portion and seed after sampling; and (g) allow for the tracking of separate seed parts and their correlation to other samples in a group.

Some of these objectives that are desirable when sampling seed can be conflicting and even antagonistic. For example, high throughput methodologies may require relatively rapid operation but with relatively high accuracy and low contamination risk, such that they must be done more slowly than is technically possible. These multiple objectives have therefore existed in the art and have not been satisfactorily addressed or balanced by the currently available apparatuses, methods and systems. There is a need in the art to overcome the above-described types of problems such that the maximum number of objectives is realized in any given embodiment.

BRIEF SUMMARY OF THE INVENTION

Apparatuses, methods and systems for positioning, orienting, creating, handling, collecting, and indexing seed portions, including viable seed portions, from plant seed is disclosed. In one general example of the apparatus, the apparatus includes a carrier having a feature for positioning and orienting seeds, seed portions or the like. Seed portions may be taken from seed in carrier. One or more manifolds aid in separating, collecting and indexing seed and seed portions in an efficient and high throughput manner.

A general example of a method for positioning, orienting, creating, handling, collecting, and indexing seed portions, including viable seed portions, from plant seeds is also disclosed. The method may include positioning and orienting seed relative to carrying positions within a carrier, ablating the seed with a seed ablation device, separating, collecting and indexing seed and seed portions using a manifold, a collector and compartment layer.

A general example of a system for positioning, orienting, creating, handling, collecting, and indexing seed portions, including viable seed portions, from plant seeds is also disclosed. The system may include a carrier adapted to retain seed in a desirable position and orientation and release seed or seed parts from the desired position and orientation in a high through put manner. The system may also include a seed ablation device, a manifold adapted to handle, collect and index seed and seed portions (post-sampling) into one or more containers.

An apparatus for automated positioning, orienting, handling, collecting and indexing seed samples is also disclosed. The apparatus includes automated methods and systems to handle, separate and collect seed and seed parts in an indexed manner with minimal human intervention, thereby increasing the handling and separation efficiency and throughput of seed and their seed parts while reducing the chance of contamination.

BRIEF DESCRIPTION OF THE EXEMPLARY EMBODIMENTS

DETAILED DESCRIPTION OF THE PREFERRED EMBODIMENT

Overview

Figure 1A:
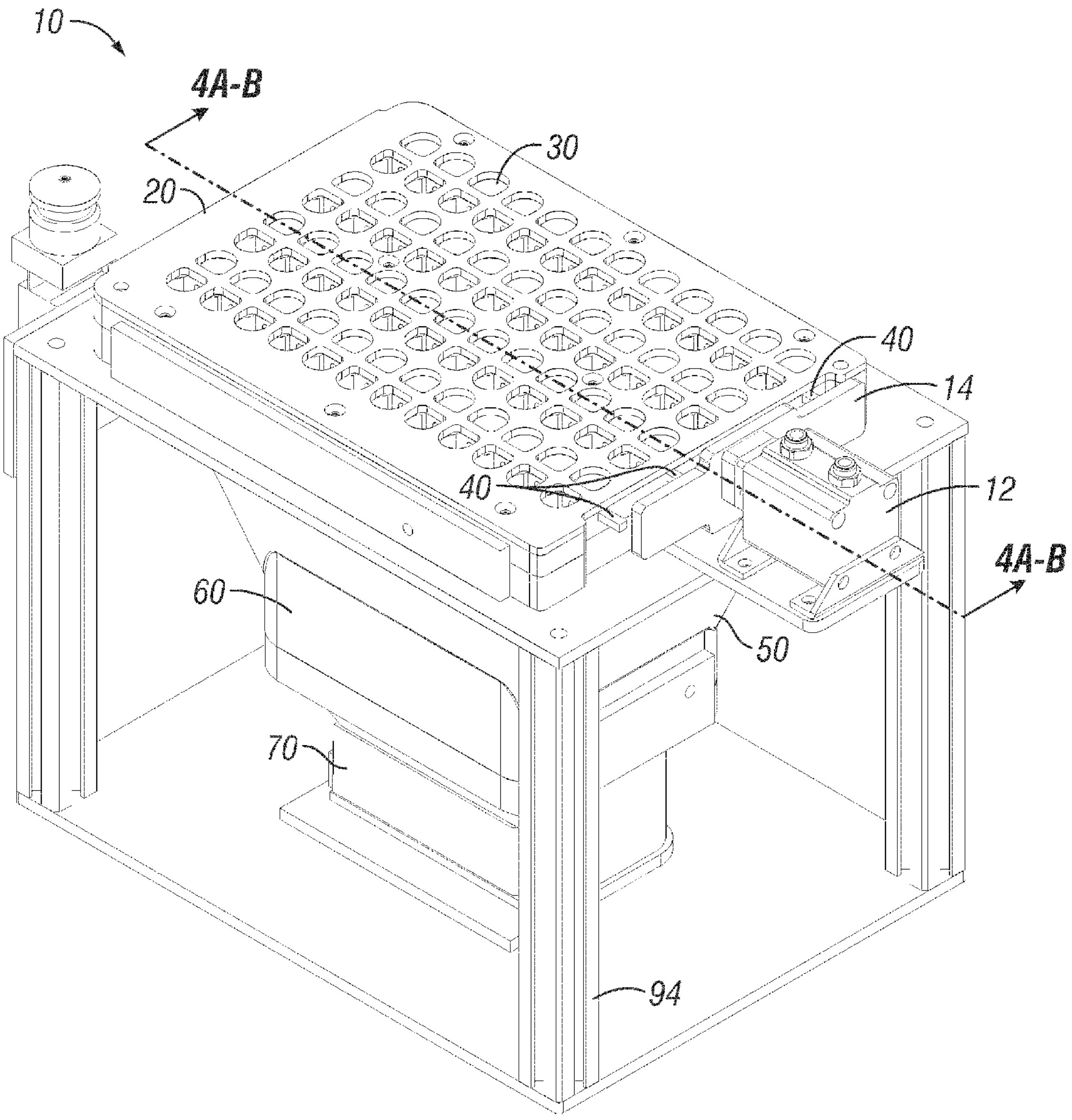
FIG. 1A is a perspective view showing the apparatus according to an exemplary embodiment of the present invention

For a better understanding of the invention, several exemplary embodiments will now be described in detail. It is to be understood that these are but several forms the invention can take and do not limit the invention. Reference will be taken from time-to-time to the appended drawings. Reference numerals are used to indicate certain parts and locations in the drawings. The same reference numerals will indicate the same parts and locations throughout the drawings unless otherwise indicated.

The context of these specific examples will be with respect to kernels of corn. It is to be understood, however, that this example is only intended to illustrate one application of the invention. The invention can be utilized for other seed and other objects. The range of sizes can vary as well as the nature of the object. As will be understood by one of skill in the art, the embodiments of the invention will be used with seed that are of convenient size to be sampled. Some seed are extremely fine and small, somewhat like dust particles or grains of salt, while others are particularly large and hard, such as the seed from the *Lodoicea maldivica* palm, which are 20 to 24 pounds in weight. One of skill in the art recognizes that seed intended to be used with the embodiments of the invention must be of a size and weight that allow convenient sampling with the apparatus of the embodiments. Such seed include, but are not limited to, many agriculturally important seed such as seed from maize (corn), soybean, *Brassica* species, canola, cereals such as wheat, oats or other grains, and various types of vegetable and ornamental seed. Analogous applications will be obvious from this example and variations obvious to those skilled in the art will be included.

Reference will be made to samples taken from a seed as seed crowns. The seed crown that has been taken can also be referred to using different terms, such as, for example, seed portion, seed sample, seed tissue sample, seed chip, seed snip, seed sliver, seed clip or clipping, and viable seed portion. The use of the term crown is with specific reference to kernels of corn according to the preferred embodiment, but it is appreciated that other portions of a corn kernel or other seed source may be utilized according to the present invention.

Method

Figure 1B:
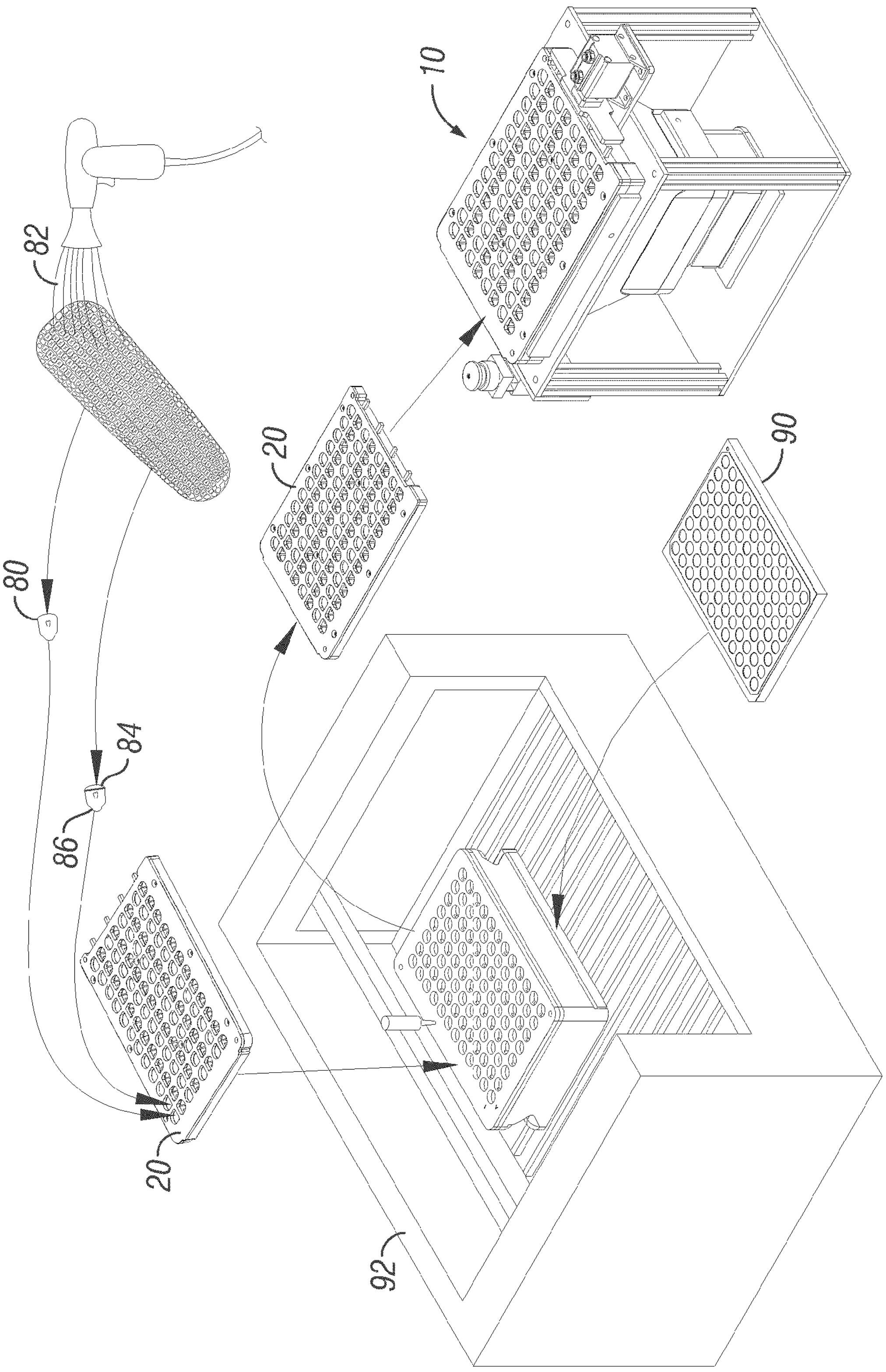
FIG. 1B is a drawing showing various stages of the system by which the seeds are coated, removed, separated into crown and body, and finally indexed.
Figure 4A:
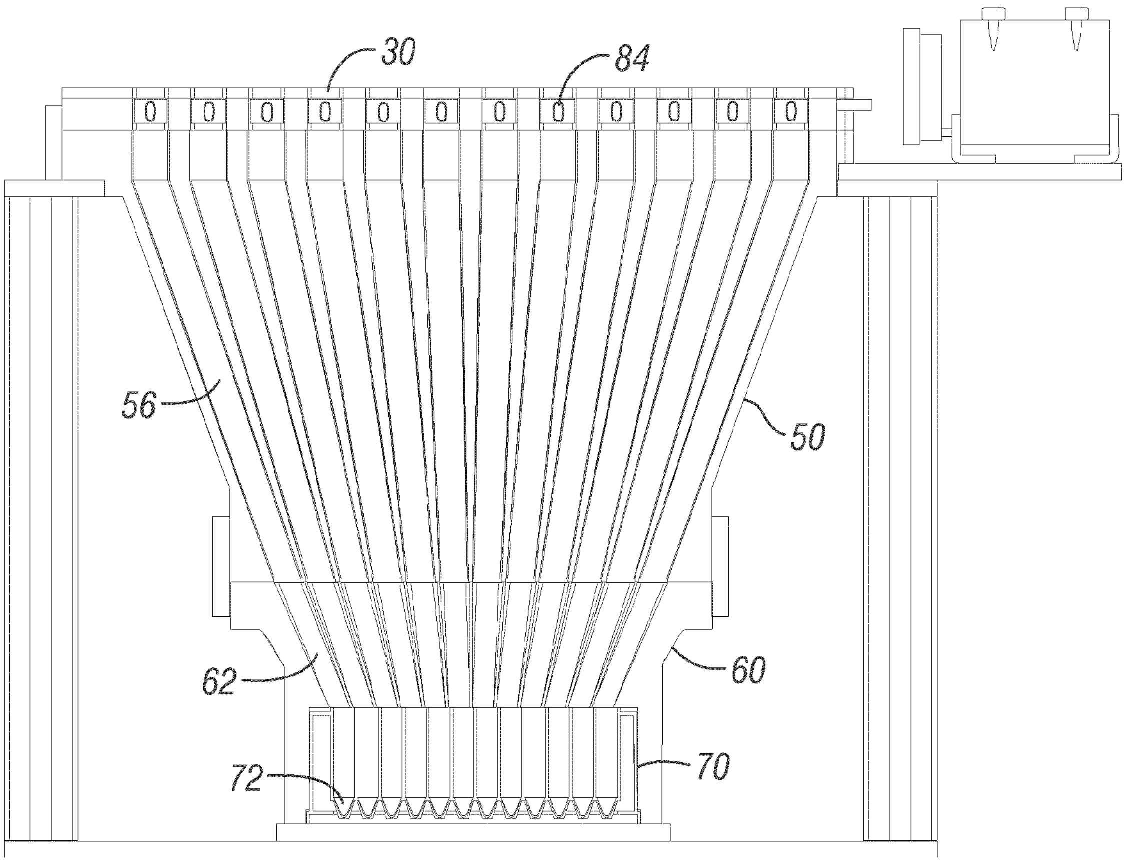
FIG. 4A is a sectional view of the apparatus taken along line 4A-4A in FIG. 1A.
Figure 4B:
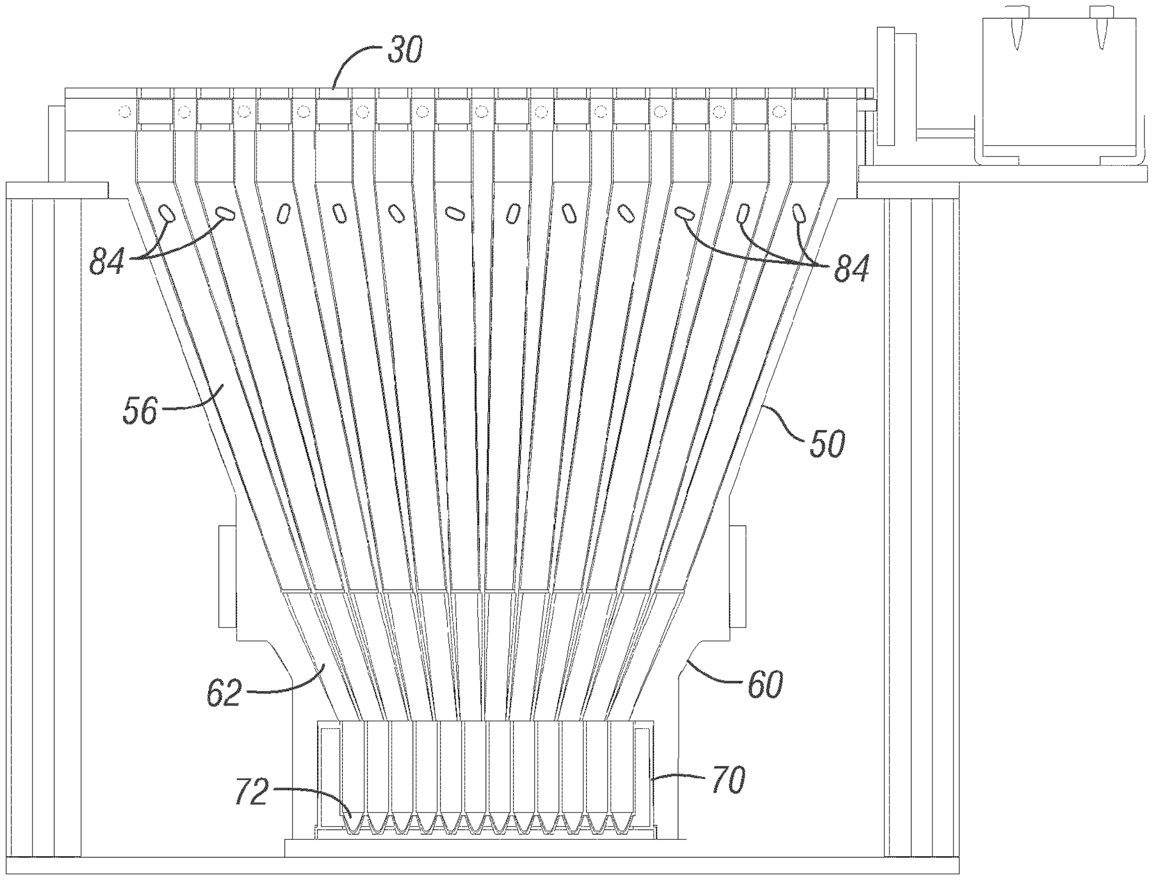
FIG. 4B is another sectional view of apparatus taken along line 4B-4B in FIG. 1A.

The apparatus herein described is for use with the method generally shown in FIG. 1B. A sample seed source 78, such as an ear of corn, is coated by a magnetically active paint 82 in a first step. Individual seeds 80 are located and aligned in a number of apertures 30 within a seed carrier 20 in a second step. The seed carrier 20 is then placed on a laser cutter 92 where the crown 84 of the seed 80 is separated from the body 86 of the seed 80 in a third step. Once separated from the crown 84, the seed bodies 86 fall into an indexed seed package 90. The seed carrier 20, to which seed crowns 84 are still attached, is then moved to the collecting apparatus 10 in a fourth step. Once placed on the apparatus, an empty collector 70 is inserted in the apparatus 10. The collector 70 may be a lab tray or other known means for storing viable seed samples. As shown in FIGS. 4A and 4B, the piston 12 is then actuated, causing all of the stored seed 80 crowns to fall at once from the seed carrier 20 through the manifolds 50, 60 and into the individual chambers 72 of the collector 70 as a fifth and final step. In this manner, the seed crowns 84 are indexed in individual chambers 72 corresponding to the indexed seed bodies 86 which were removed by the laser cutter 92 and stored in the seed collector 90. The seed crowns 84 may therefore be tested under destructive testing methods, while preserving the seed body 86 for planting and further testing or development.

The above described method is the preferred embodiment of the invention, but additional steps or alternative means might be used to accomplish the object of the invention. For instance, the seed crown 84 may be held in the apertures 30 by a pressure differential, interference fit, vacuum, adhesive, tray, electromagnet, or other such means. Also, while the slidable walls 40 are preferably displaced by actuating a pneumatic cylinder, other alternatives might be used. The tabs 46 might be pushed or pulled by a motor, pneumatic or hydraulic piston, or manual operation. Alternative means of holding the seed crown 84 within the aperture 30 allows for alternative means of removal. A pressure differential or vacuum holding may be released by a shutoff valve, pressure switch, manual operation, or automated timer. An interference fit hold may be released by manual or mechanical operation. An adhesive hold may be released by chemical, manual, or mechanical interaction with either the seed crown or the adhesive. A tray may be displaced by pushing or pulling the tray according to mechanical, pneumatic, hydraulic, manual, or automated means. Instead of permanent magnets, temporary electromagnets might be used as a holding means, and may be released by manual or automated interaction with an electrical circuit to disrupt the magnetic charge. Alternatively, the electromagnets could be displaced, as in the preferred embodiment. The above described alternatives to the preferred embodiment are merely examples, and other means not discussed may be used to accomplish the objects of the invention.

Additional steps may also be present in the method which are not part of the process of singulating, ablating, and indexing the seed. The various parts of the apparatus may be cleaned after each use to prevent cross contamination of genetic material between seed samplings. An identifier, such as a tag, label, RFID, bag, or other such marker may be associated with the carrier 20 and attached to the collector 70 after the seed crowns 84 are deposited therein. If the seed crowns 84 become lodged within the second manifold 60, the second manifold 60 may be removed from the apparatus 10 such that the seed crowns 84 may be dislodged. Once the seed crowns 84 are deposited within the collector 70, the collector 70 would be moved to a laboratory setting where the seed crowns would be tested according to a preferred means. Apparatuses, methods and systems for coating the seeds with a magnetically active coating is shown and described, for example, in U.S. application Ser. No. 12/419,690, filed Apr. 7, 2009, which application is assigned to the owner of the present application and incorporated by reference herein in its entirety.

Apparatus

Figure 1C:
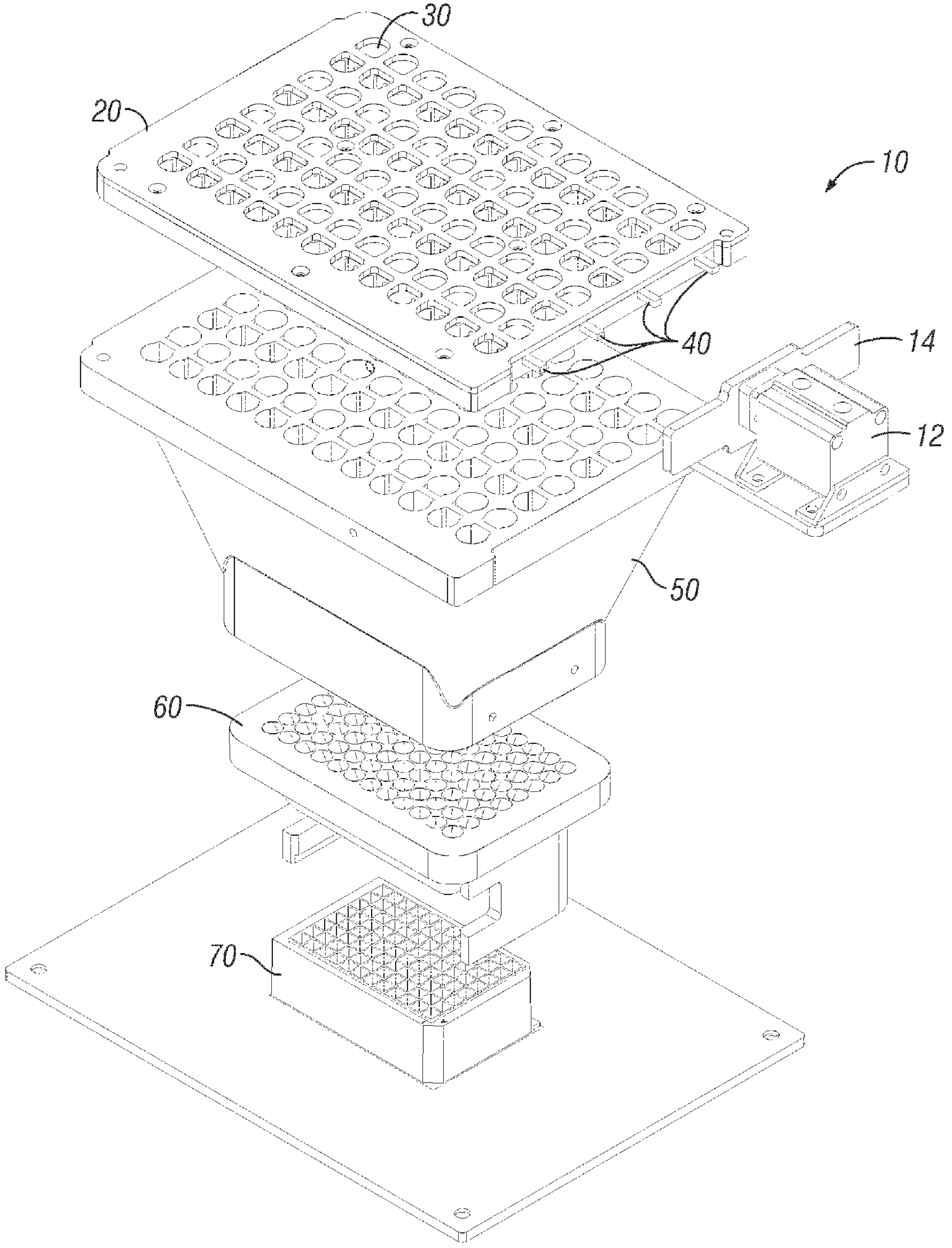
FIG. 1C is an exploded perspective view of the apparatus shown in FIG. 1A.
Figure 2:
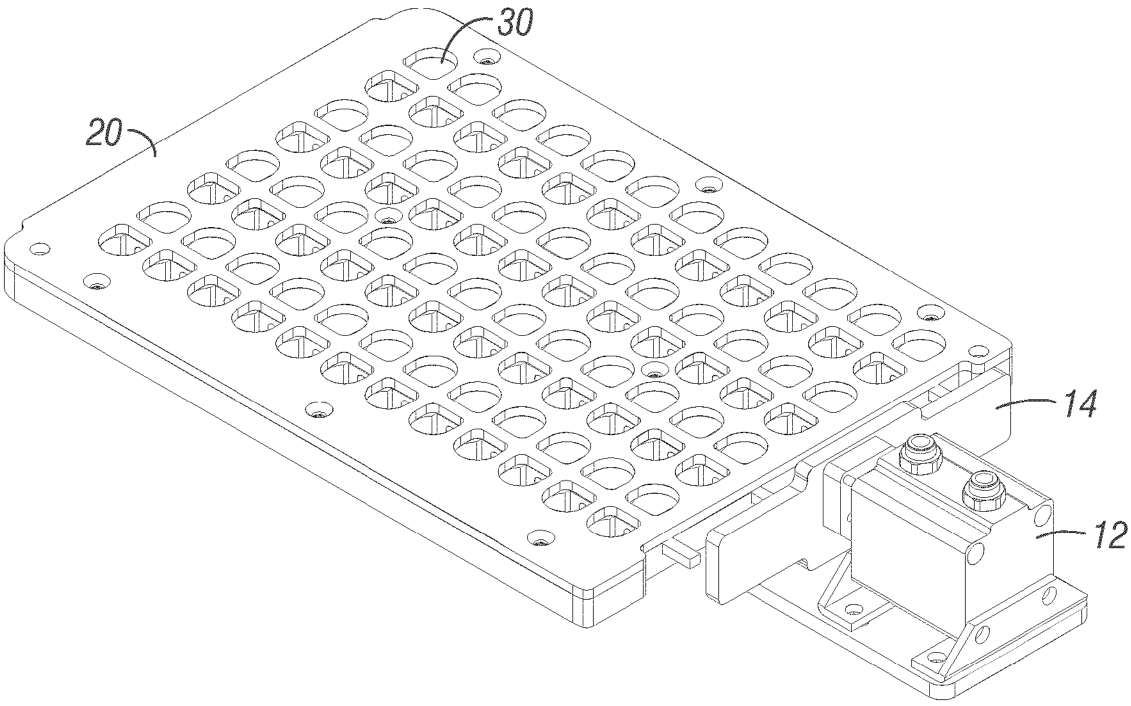
FIG. 2 is a perspective view of the seed carrier shown in FIG. 1A.
Figure 3:
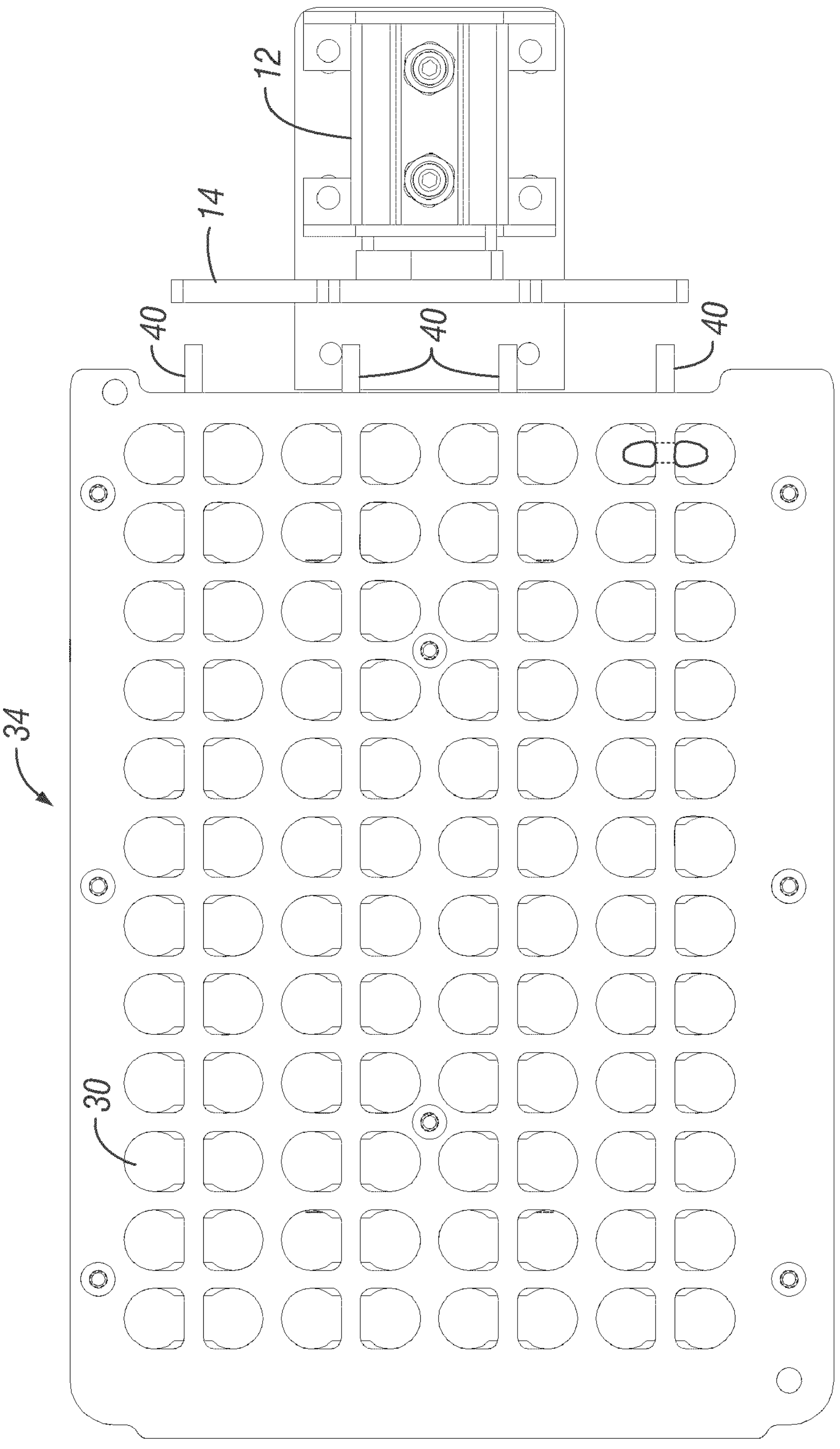
FIG. 3 is a top view of the seed carrier shown in FIG. 2.
Figure 5:
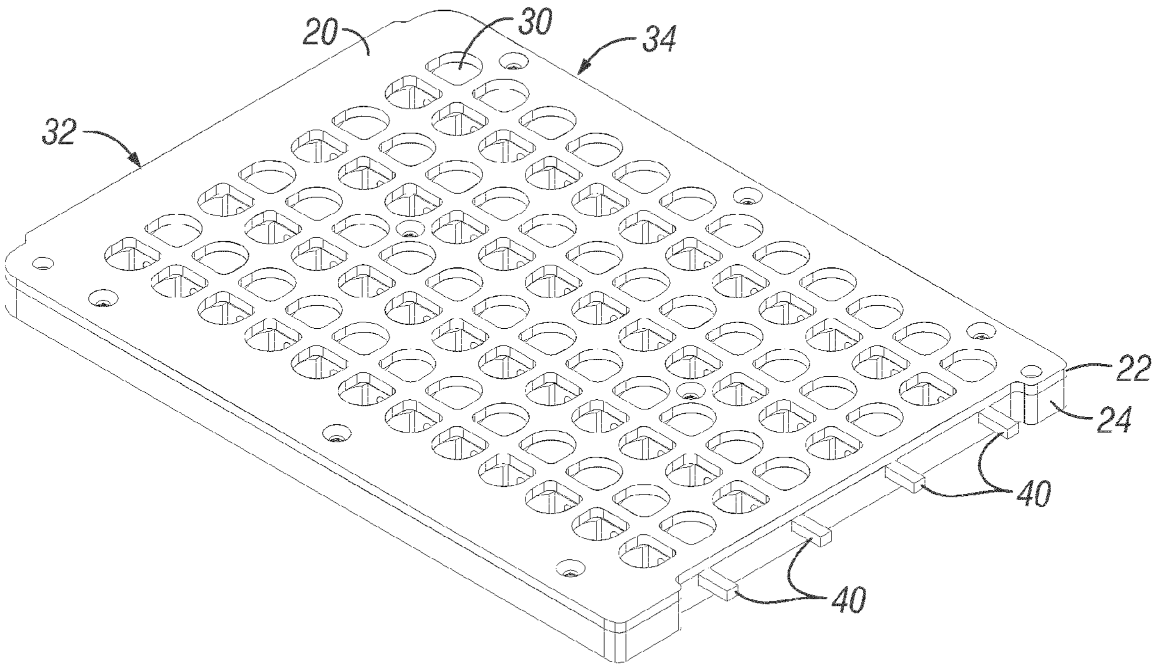
FIG. 5 is a perspective view of the seed carrier shown in FIG. 2.

Specific reference will now be made to the apparatus 10 as shown in FIGS. 1A and 1C. The apparatus 10 comprises a seed carrier 20, a first manifold 50, a second manifold 60, a collector 70, as well as a piston 12 and an arm 14. As shown in FIGS. 4A-B, the number of apertures 30 in seed carrier 20 aligns with a number of conduits 56 passing through the first manifold 50. As further shown in FIGS. 4A-B, the first manifold 50 tapers from a top end 52 corresponding generally with the size of the seed carrier 20 to a narrow bottom end 54. This narrow bottom end 54, as shown in FIG. 5, corresponds to the size and shape of the second manifold 60. The second manifold 60 has a number of passages 62 there through, the passages 62 tapering as they pass through the second manifold 60. A collector 70, such as that shown in FIGS. 11A-B, has a number of chambers 72 therein, preferably arranged in rows and columns corresponding to the rows 32 and columns 34 of the apertures 30 in the seed carrier 20. As can be appreciated and shown in FIGS. 4A-B, the size of each individual aperture 30 is larger than the size of each chamber 72 in the collector 70. Such an arrangement allows for easier and more economical storage of the seed crowns 84, in the collector 70, while the apertures 30 must be sized for the whole seed 80. The collector 70 is preferably a commercially available microtiter plate tray, which is a standardized, science based formatted tray, which allows the collection apparatus 10 to be used in conjunction with standard science practices, such as in robotic liquid handling and other applications.

Figure 6:
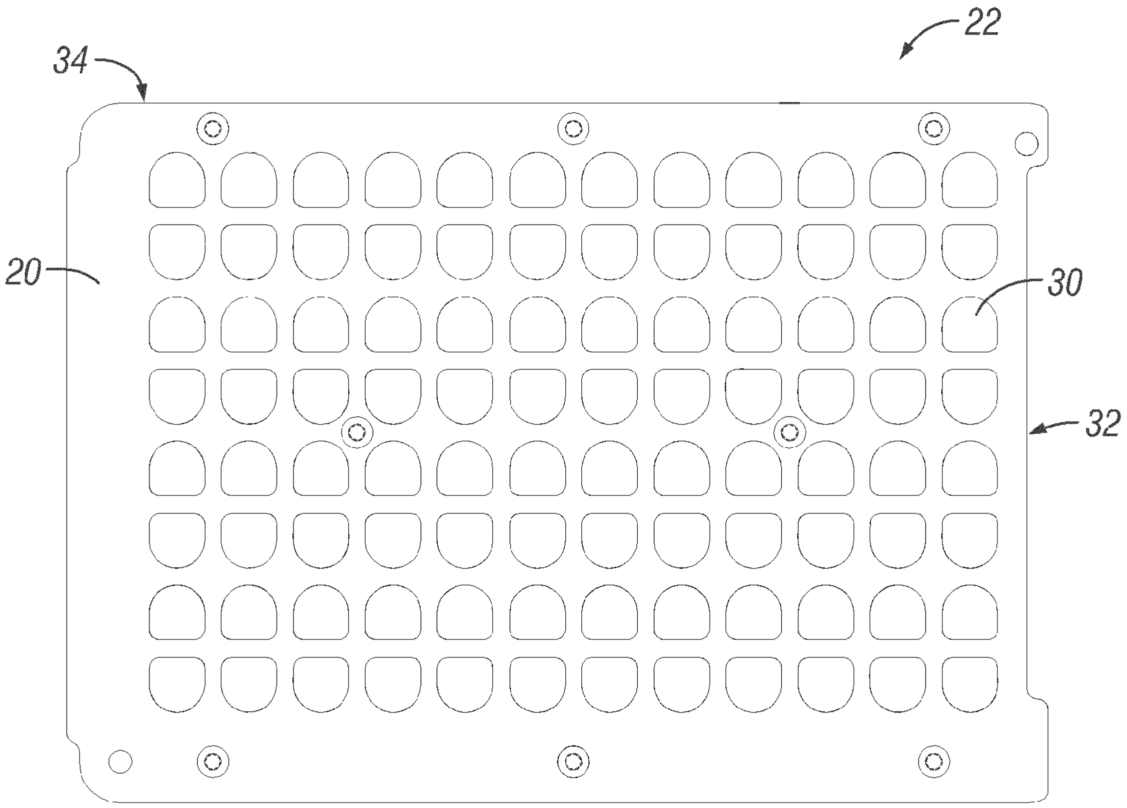
FIG. 6 is a top view of a first plate of the seed carrier shown in FIG. 5.
Figure 7:
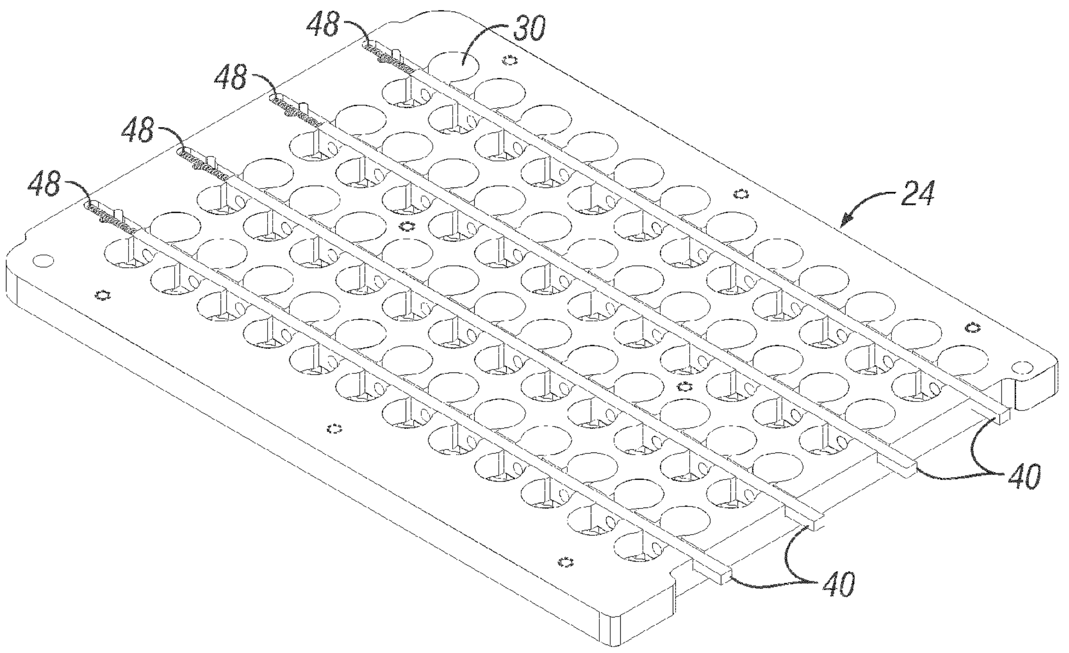
FIG. 7 is a perspective view of a second plate of the seed carrier shown in FIG. 5.
Figure 8:
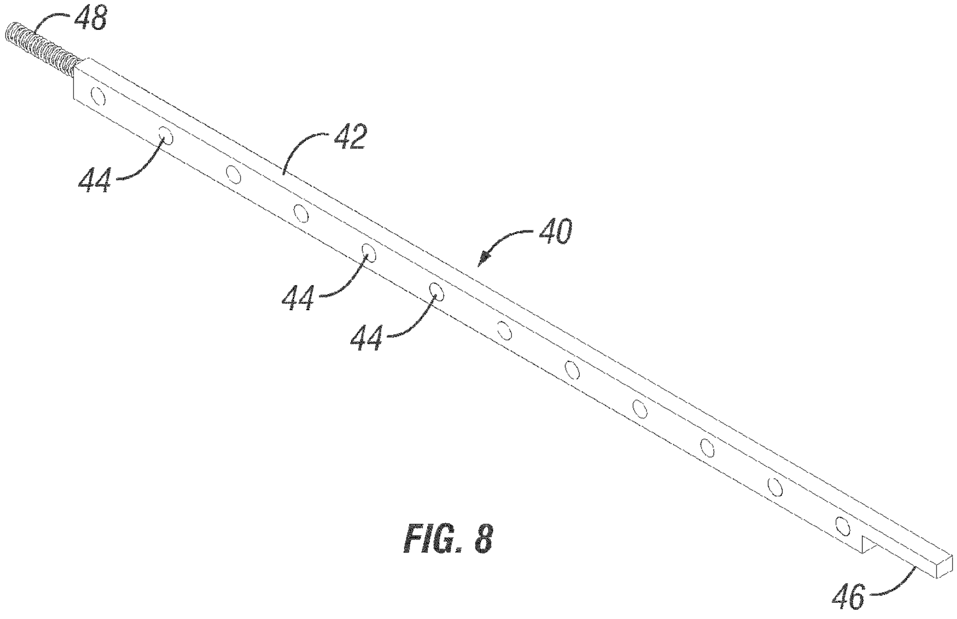
FIG. 8 is a perspective view of an exemplary embodiment of a partition bar of the seed carrier shown in FIG. 7.

As shown in FIG. 5, the seed carrier 20 is made up of a first plate 22 and a second plate 24. A number of apertures 30 as shown in FIG. 6 are arranged in a number of rows 32 and columns 34. As shown in FIG. 7, a number of slidable walls 40 run in grooves between these rows 32 and are disposed between the first plate 22 and the second plate 24. Each slidable wall 40, as shown in FIG. 8, is composed of a base part 42 and a number of magnets 44 disposed thereon. Each slidable wall 40 further has a tab 46 extending beyond the perimeter of the first plate 22 and second plate 24. Within the seed carrier 20, a spring 48 is located opposite the tab 46 for returning the slidable wall 40 to a designated position when the piston 12 is deactivated.

As shown in FIG. 7, the slidable walls 40 separate the apertures 30 in adjoining rows 32 from one another. The magnets 44 are aligned with these apertures 30 when the slidable walls 40 are in a relaxed or neutral position, and the magnets 44 are displaced from the apertures 30 when the piston 12 is actuated. As further shown in FIG. 7, according to the preferred embodiment, the rows 32 are paired with one slidable wall 40 separating each set of rows 32, such that the number of slidable walls 40 is less than the number of rows 32.

Figure 9A:
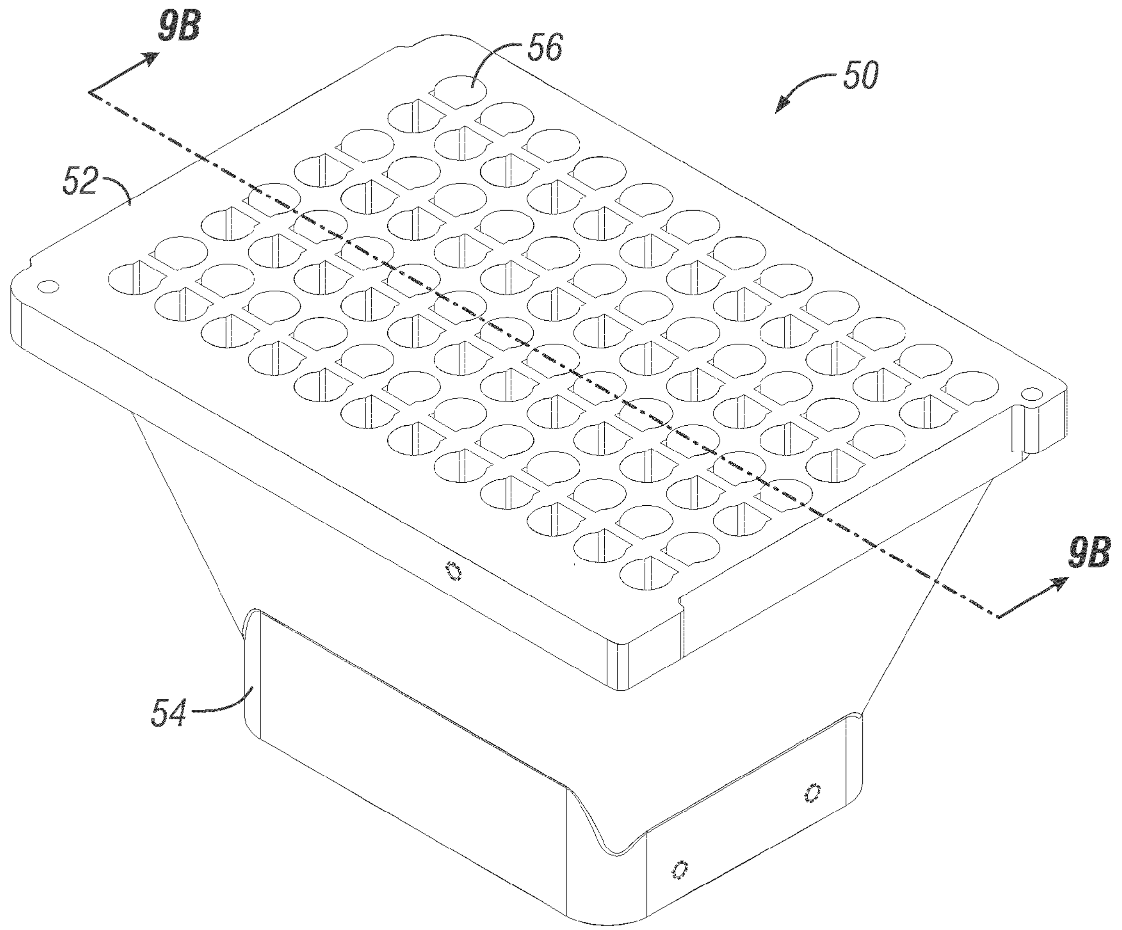
FIG. 9A is a perspective view of the first manifold shown in FIG. 1C.
Figure 9B:
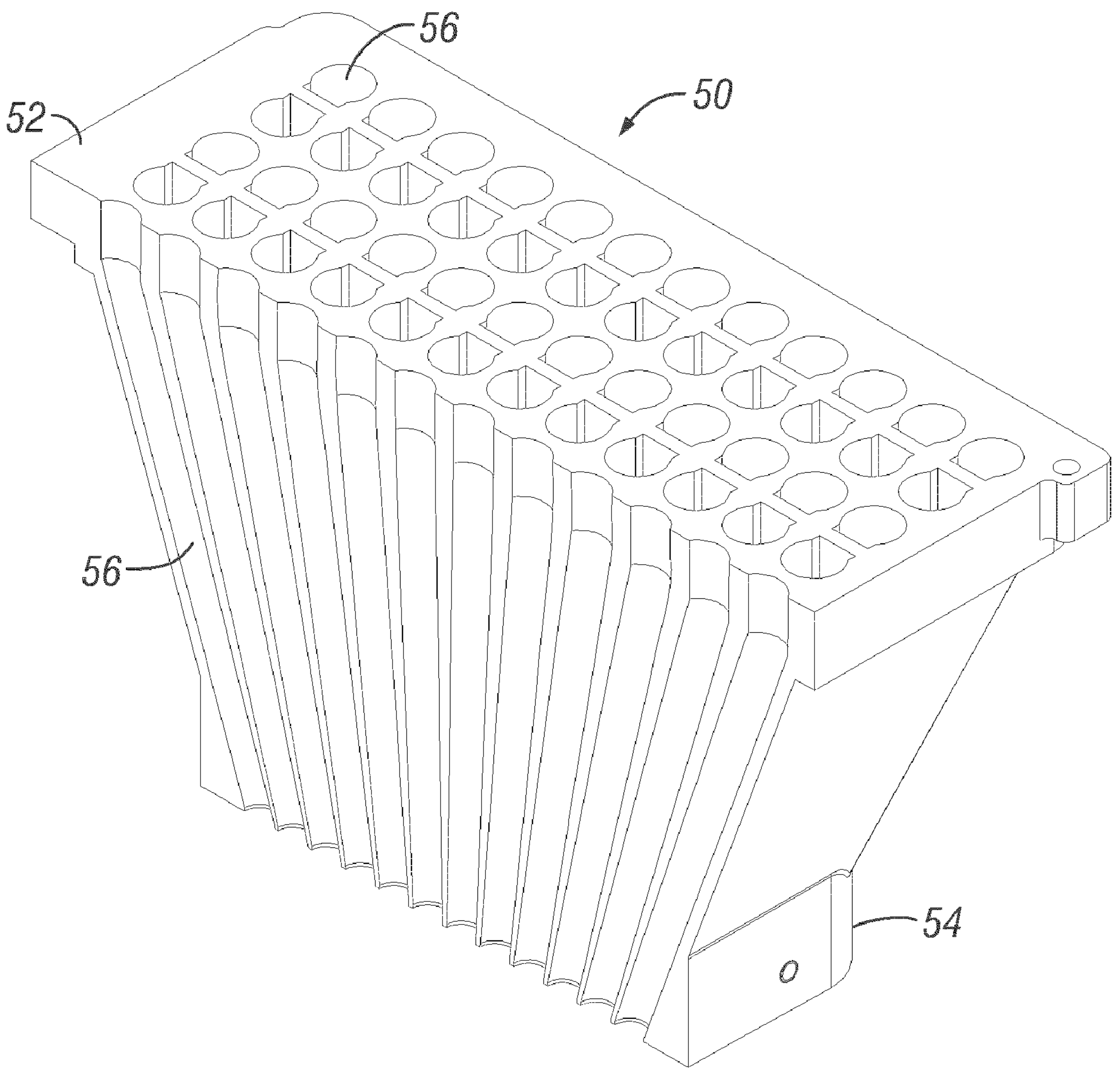
FIG. 9B is a sectional view of the first manifold taken along line 9B-9B in FIG. 9A.

Turning now to FIGS. 9A-B there is shown the first manifold 50. The first manifold 50 consists of a number of conduits 56 running from the top end 52 to the bottom end 54. The conduits 56 at the top end 52 are preferably numbered and arranged so as to correspond to the apertures 30 in the seed carrier 20. As the first manifold 50 tapers to the bottom end 54, the conduits 56 converge upon one another. This convergence is evident in FIG. 9B. During operation of the apparatus 10, once the seed crowns 84 are released from the seed carrier 20 they pass into the first manifold 50 at the top end 52, passing out of the manifold of the bottom end 54.

The conduits 56 taper at a certain angle from the top end 52 to the bottom end. The angle at which the conduits 56 converge is determined by the relative sizes of the carrier 30 and the collector 70, as well as the height of the manifold 50. This angle of convergence must be controlled so as to allow seed crowns 84 to fall through the manifold 50 without significant contact between the seed crown 84 and the sidewalls of the conduits 56. A steeper angle of convergence permits the seed crown 84 to fall too fast, increasing the likelihood that the seed crown 84 becomes lodged in either the first 50 or second manifold 60. Conversely, a shallow angle of convergence increases the contact between the seed crown 84 and the sidewall of the conduit 56. This increased contact may result in abrasion of the seed crown 84, increasing the likelihood of cross contamination between successive seed samplings. Additionally, the abrasion reduces the speed at which the seed crown 84 falls through the first manifold 50, increasing the cycle time of the method, and potentially resulting in the seed crown 84 becoming lodged in the first manifold 50. Either of these two situations are undesirable, the convergence angle has been chosen in order to minimize the risk of the seed crown 84 becoming stuck within the manifold 50. The first manifold 50 also need not have a convergence angle, and the seed crowns 84 may fall cleanly through the first manifold 50 to the second manifold 60. As will be discussed for the second manifold 60, the conduits 56 of the first manifold may reduce in diameter along the length of the manifold 50. Additionally, the number and arrangement of the conduits 56 need not correspond to the number and arrangement of the apertures 30 in the collector 20.

Figure 10A:
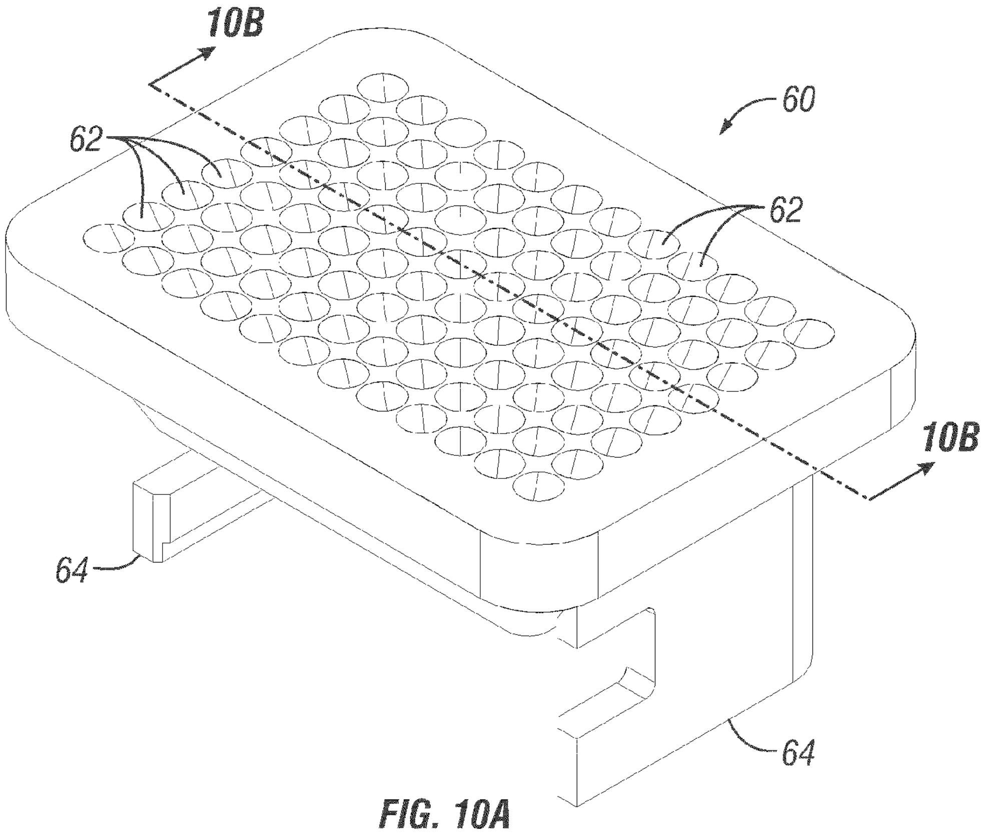
FIG. 10A is a perspective view of the second manifold shown in FIG. 1C.
Figure 10B:
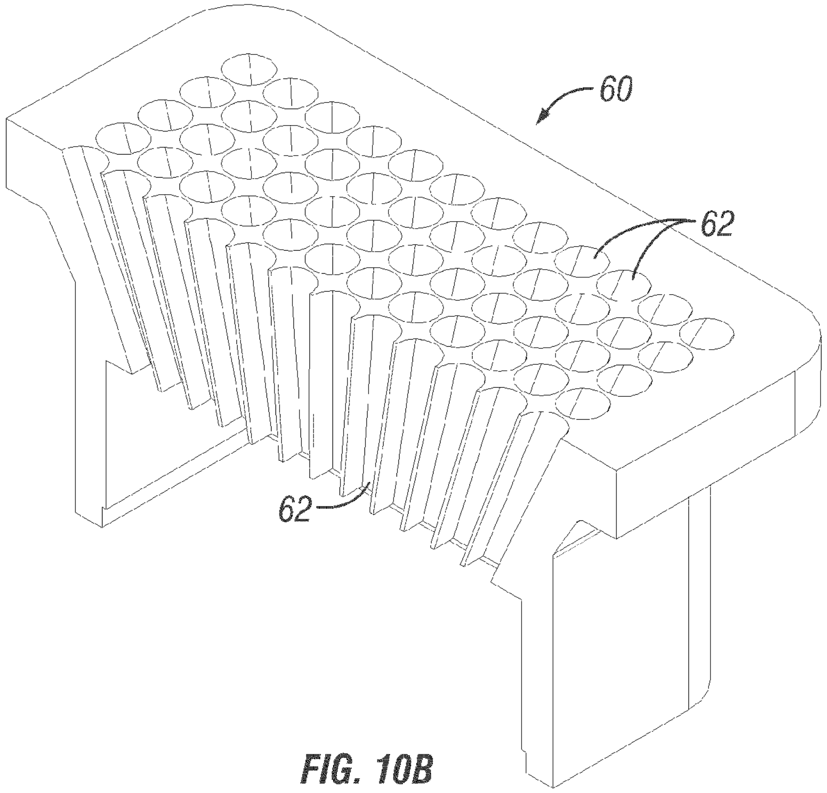
FIG. 10B is a sectional view of the second manifold taken along line 10B-10B in FIG. 10A.

As shown in FIG. 1C, the second manifold 60 is positioned beneath the first manifold 50. The second manifold 60 features a number of passages 62 there through, the passages 62 corresponding in number and arrangement with the openings of the conduits 56 on the bottom end 54 of the first manifold 50. The second manifold 60 is shown in FIGS. 10A-B. The passages 62 pass through the second manifold 60 as shown, taper in size to correspond with the size of the chambers 72 in collector 70. As shown in FIG. 10A, according to one preferred embodiment, the second manifold 60 further includes a pair of flanges 64 situated on the bottom of the second manifold 60. These flanges 64 are adapted to interact with the collector 70 so as to ensure alignment between the passages 62 and the chambers 72.

While the passages 62 of the second manifold 60 are shown to taper in size, non-tapering passages are also contemplated. In certain circumstances, it may be preferable not to reduce the size of the passages, for example if larger seed samplings are collected. The passages 62 may also converge upon one another, as described for the first manifold 50. The second manifold 60 may also have a number of passages 62 not corresponding to the number and arrangement of the conduits 56 in the first manifold 50. Also, while the second manifold 60 is described as commensurate in size with the bottom end 54 of the first manifold 50. This is not required, and the second manifold 60 may be of any size and shape sufficient to carry out the objects of the invention, or the second manifold 60 may be incorporated into the first manifold 50.

Further, according to the preferred embodiment, the second manifold 60 may be removed from the apparatus 10, while still being attached to the collector 70 through the flanges 64, allowing ease of removing seed crowns 84 which may become stuck in the second manifold 60 from the second manifold 60 to the proper chamber 72. The flanges 64 also provide a means by which the collector 70 is properly aligned with the passages 62 of the second manifold 60.

Other means of temporarily connecting the second manifold 60 to the collector 70 are anticipated by this invention. Several examples of fastening and aligning the collector 70 and second manifold 60 include, tabs, slots, studs, raised surfaces, interference fits, permanent or electromagnets, electrical interface, manual alignment, or any other means which is commonly known in the art. Additionally, it may be preferable to have the second manifold 60 and collector 70 unattached, for example in high throughput operations or utilizing other seed sampling techniques where there is little risk of the seed sample being stuck within the passages 62 of the second manifold 60.

Figure 11A:
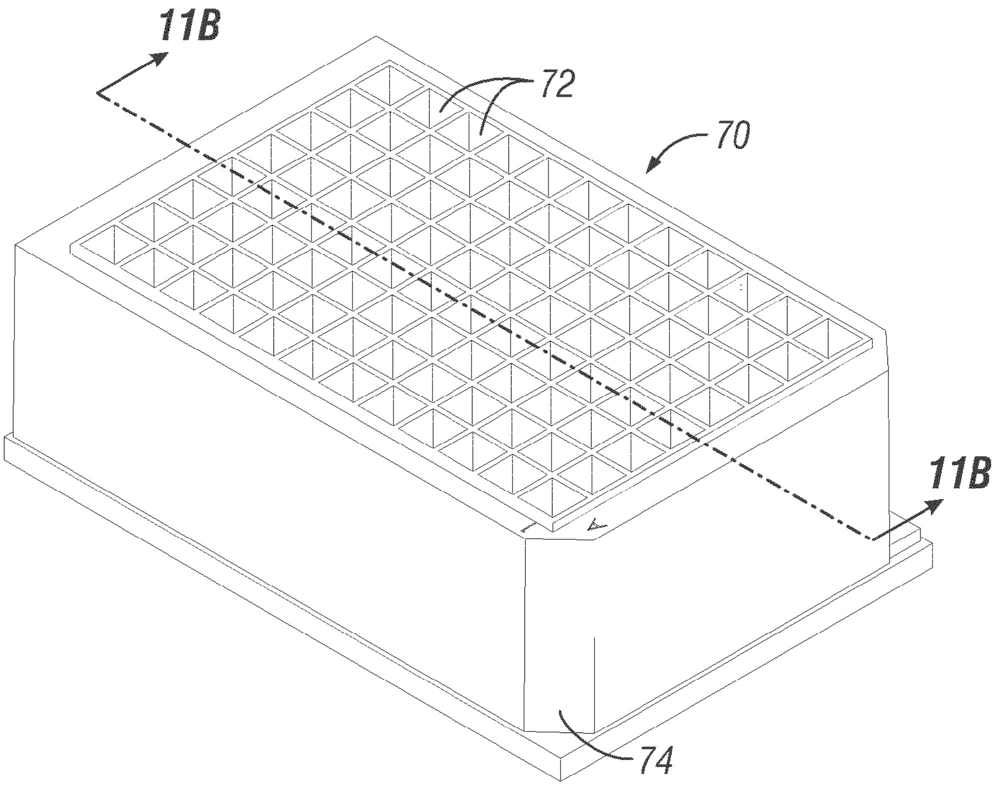
FIG. 11A is a perspective view of the collector shown in FIG. 1C.
Figure 11B:
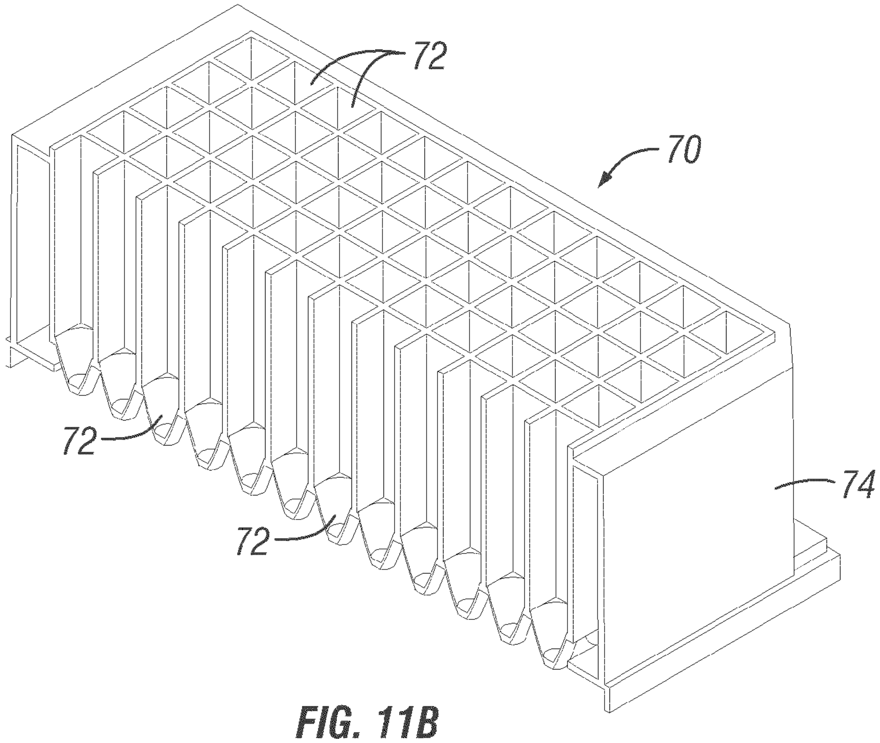
FIG. 11B is a sectional view of the collector taken along line 11B-11B in FIG. 11A.

The collector 70 is shown in FIGS. 11A-B. A number of chambers 72 are disposed therein, corresponding in number and arrangement to the passages 12 in the second manifold 60. Preferably, the number and arrangement of chambers 62 correspond with that on the seed carrier 20, however it is not required. As shown in FIG. 11A, the collector 70 also includes a filleted corner 74. This filleted corner 74 serves a dual function: first, it ensures that the carrier is properly inserted into the flanges 64 on the second manifold 60; second, the filleted corner 74 provides a reference point for indexing the seed crowns 84 to the seed body 86 removed during the earlier step of the process. The chambers 72 within the collector 70 are deep enough so that as each seed crown 84 falls into the chamber 72, the seed crown 84 is prevented from bouncing out of the chamber 72. The chamber 72 bottoms are also tapered, further limiting this risk.

As shown in FIGS. 4A and 4B, the seed crowns 84 are stored on the magnets 44. The piston 12 is in a non-actuated position with the arm 14 contacting the tabs 46 of the slidable walls 40. When the piston 12 is actuated, the slidable walls 40 shift the magnets 44 away from the apertures 30, causing the seed crowns 84 to fall at once. This arrangement improves over prior art designs which required human operation in order to remove the seed crowns 84 from the seed carrier 20.

Each of the elements of the invention above described may be made of any material known to those in the art. Preferably, the first plate 22 and second plate 24 on the seed carrier 20 are formed of aluminum, while the base 42 is formed of plastic. The magnets 44 are preferably the only magnetically conductive material in the apparatus. The first and second manifolds 50, 60 may be formed of either aluminum, plastic, or other non-magnetically reactive material. Further, the apparatus 10 is supported by a frame 94 also formed of a non-magnetically reactive material. The purpose of the elements of the apparatus 10 having non-magnetically reactive components is to ensure that the seed crowns 84 fall from the seed carrier 20 cleanly through the first manifold 50 and second manifold 60 to the collector 70. As is generally known in the art, magnetically reactive materials such as the paint 82 used on the seeds 80 is capable of acquiring a lasting magnetic charge, and if the components of the apparatus 10 were composed of magnetically reactive material, a seed crown 84 might become stuck within the apparatus 10.

As has been previously discussed, the use of magnets to hold the seed crowns 84 within the apertures 30 is preferred, but not required. Alternative means, such as vacuum or interference fit would not require the components of the invention to be formed of non-magnetically conductive materials. Specific reference has been made to the use of magnets in order to attach and align the collector 70 to the second manifold 60. In such an arrangement, at least part of either the collector 70 or the second manifold 60 would be formed of a magnetically conductive material. Additionally, if the angle of convergence of the conduits 56 in the first manifold 50 is sufficiently steep, the concern of seed samples becoming stuck in the manifold might be overcome. Therefore, while it is preferable to utilize lightweight and non-magnetically reactive materials in order to accomplish the objects of the invention, such use is not required to practice the claimed invention.

While the apertures 30 in carrier 20 and chambers 74 in collector 70 are shown to be arranged in rows and columns, the number of rows and columns being equal in number between the carrier 20 and collector 70, this is not required. It may be desirable to arrange the apertures 30 according to alternative means, such as indexing by angle and distance, or according to a hexagonal or other close packing arrangement, or any other means known in the art. Further, it is not necessary for the number or arrangement of apertures 30 to match the number or arrangement of chambers 74. For example, it might be desirable to have a collector 70 with sufficient chambers 74 to collect multiple batches of seed crowns 84, or existing processes might require a different arrangement of apertures 30 and chambers 74.

System

The system herein described uses one or more of the apparatuses shown generally in FIGS. 1A-11B. As set forth above, a sample seed source 78, such as an ear of corn, is coated by a magnetically active paint 82. The seed is separated from the plant using commercially available methods. Seed 80 is singulated into the plurality of apertures 30 within seed carrier 20. The seed carrier 20 is made up of a first plate 22 and a second plate 24. A number of apertures 30 as shown in FIG. 6 are arranged in a number of rows 32 and columns 34. The apertures could be arranged in any configuration so that a partition, such as slidable wall 40, could separate adjoining apertures. As shown in FIG. 7, a slidable wall 40 is set in channels formed between adjoining rows 32 or adjoining apertures. The slidable wall 40 is disposed between the first plate 22 and the second plate 24. Each slidable wall 40, as shown in FIG. 8, is composed of a base part 42 and a number of magnets 44 disposed thereon or therein. Each slidable wall 40 further has a tab 46 extending beyond the perimeter of the first plate 22 and second plate 24. Within the seed carrier 20, a spring 48 is located opposite the tab 46 for returning the slidable wall 40 to a designated or home position when the piston 12 is deactivated. In one aspect, seed carrier 20 is placed in a laser cutter 92 where the crown 84 of the seed 80 is separated from the body 86 of the seed 80. Once separated from the crown 84, the seed bodies 86 fall into an indexed seed package 90. The seed carrier 20, to which seed crowns 84 are still attached, is then moved to collecting apparatus 10. The collecting apparatus 10 includes a first manifold 50 having a plurality of conduits 56 running from the top end 52 to the bottom end 54. The conduits 56 at the top end 52 are preferably numbered and arranged so as to correspond to the apertures 30 in the seed carrier 20. As the first manifold 50 tapers to the bottom end 54, the conduits 56 converge upon one another. This convergence is evident in FIG. 9B. During operation of the apparatus 10, once the seed crowns 84 are released from the seed carrier 20 they pass into the first manifold 50 at the top end 52, passing out of the manifold at the bottom end 54. The collecting apparatus 10 also includes a second manifold 60, positioned beneath the first manifold 50. The second manifold 60 features a number of passages 62 there through; the passages 62 correspond in number and arrangement with the openings of the conduits 56 on the bottom end 54 of the first manifold 50. The second manifold 60 is shown in FIGS. 10A-B. The passages 62 pass through the second manifold 60 as shown, taper in size to correspond with the size of the chambers 72 in collector 70. As shown in FIG. 10A, according to one preferred embodiment, the second manifold 60 further includes a pair of flanges 64 situated on the bottom of the second manifold 60. These flanges 64 are adapted to interact with the collector 70 so as to ensure alignment between the passages 62 and the chambers 72. According to one aspect of the system, the carrier 20 is placed on collecting apparatus 10 and an empty collector 70 is inserted at the bottom of second manifold 60. The collector 70 may be a lab tray or other known means for storing viable seed samples. As shown in FIGS. 4A and 4B, the piston 12 is then actuated, causing all of the stored seed 80 crowns to fall at once from the seed carrier 20 through the manifolds 50, 60 and into the individual chambers 72 of the collector 70. In this manner, the seed crowns 84 are indexed in individual chambers 72 corresponding to the indexed seed bodies 86 which were removed by the laser cutter 92 and stored in the seed collector 90. The seed crowns 84 may therefore be tested, while preserving the seed body 86 for planting and further testing or development.

The above described system is a preferred embodiment of the invention, but additional or alternative systems could be used to accomplish one or more of the objects of the invention. For instance, the system may be configured so that the seed crown 84 is held in the apertures 30 by a pressure differential, interference fit, vacuum, adhesive, tray, electromagnet, or other such means. Also, while the slidable walls 40 are preferably displaced by actuating a pneumatic cylinder, other alternatives might be used. The walls 40 might be pushed or pulled by a motor, pneumatic or hydraulic piston, or manual operation in other aspects of the system. Alternative means of holding the seed crown 84 within the aperture 30 allows for alternative means of removal. A pressure differential or vacuum holding may be released by a shutoff valve, pressure switch, manual operation, or automated timer. An interference fit hold may be released by manual or mechanical operation. An adhesive hold may be released by chemical, manual, or mechanical interaction with either the seed crown or the adhesive. In another system, a tray may be displaced by pushing or pulling the tray according to mechanical, pneumatic, hydraulic, manual, or automated means. Instead of permanent magnets, temporary electromagnets might be used as a holding means, and may be released by manual or automated interaction with an electrical circuit to disrupt the magnetic charge. Alternatively, the electromagnets could be displaced, as in the preferred embodiment. The above described alternative systems are merely examples, and other means or systems not discussed may be used to accomplish the objects of the invention.

Additional steps may also be present in the systems which are not part of the process of singulating, ablating, and indexing the seed. The various parts of the system(s) may be cleaned after each use to prevent cross contamination of genetic material between seed samplings. An identifier, such as a tag, label, RFID, bag, or other such marker may be associated with the carrier 20 and attached to the collector 70 after the seed crowns 84 are deposited therein. If the seed crowns 84 become lodged within the second manifold 60, the second manifold 60 may be removed from the collecting apparatus 10 such that the seed crowns 84 may be dislodged. Once the seed crowns 84 are deposited within the collector 70, the collector 70 would be moved to a laboratory setting where the seed crowns would be tested according to a preferred means. Apparatuses, methods and systems for coating the seeds with a magnetically active coating are shown and described, for example, in U.S. application Ser. No. 12/419,690, filed Apr. 7, 2009, which application is assigned to the owner of the present application and incorporated by reference herein in its entirety The above described apparatus and system for separating a seed crown from a seed body in order to preserve a seed sample adequate for planting is in representative capacity only and is not intended to limit the scope of the invention. Limitations of the present invention shall appear in the claims.

What is claimed is:

1. An apparatus for processing and sorting a number of seeds or seed portions having a magnetically responsive coating, the apparatus comprising:
- a carrier having a plurality of apertures;
- a slidable wall separating adjoining apertures, said slidable wall including a seed position common to adjoining apertures;
- a manifold having a plurality of conduits corresponding with said apertures in said carrier; and
- a collector having a plurality of chambers corresponding to said conduits in said manifold.

2. The apparatus of claim 1 further comprising a mechanism acting on said slidable wall to move said seed position from said aperture to release said seed portion into said collector.

3. The apparatus of claim 2 wherein the slidable wall is moveable between a first and second position:
- a. said seed position being coincident with adjoining apertures in said first position; and
- b. said seed position being out of communication with adjoining apertures in said second position.

4. The apparatus of claim 1 wherein said manifold comprises a first manifold interfacing with said carrier and a second manifold interfacing with both said first manifold and said collector.

5. The apparatus of claim 1 wherein said seed position comprises a magnet disposed in the slidable wall for attracting said magnetically active coating to retain said seed or seed portion at said seed position on said slidable wall.

6. The apparatus of claim 2 wherein said mechanism comprises an actuator for selectively displacing said seed position on said slidable wall out from between adjoining apertures.

7. A high throughput method for sorting and nondestructively preparing seeds for testing for specific desirable characteristics, the method comprising the steps of:
- coating a portion of the seed with a magnetically active coating;
- magnetically retaining the seed at a seed position;
- removing a tissue sample from the seed;
- collecting the removed tissue sample; and
- moving the seed position to release the sampled seed for collecting,
- wherein the seed position is contained in a slidable wall separating adjoining apertures, and wherein moving the seed position to release the sampled seed comprises sliding the slidable wall.

8. The method of claim 7 further comprising the step of attaching said seed carrier with an apparatus for indexing the sampled seed into a collector.

9. The method of claim 7 further comprising the step of indexing the sampled seed with the tissue sample removed from the sampled seed.

10. A seed carrier for use in singulating and aligning seed for ablating a portion of the seed comprising:
- a bottom plate comprising a plurality of apertures, and a channel separating adjoining apertures;
- a slidable wall in said channel, said slidable wall comprising an elongated body having a magnet common to opposite surfaces of the body and corresponding with adjoining apertures in said bottom plate; and
- a top plate having a plurality of apertures corresponding to said apertures in said bottom plate, said top plate being attached to said bottom plate whereby said slidable wall is enclosed between said plates.

11. The carrier of claim 10 wherein said top plate, said bottom plate, and said slidable wall comprise a non-magnetic material.

12. The carrier of claim 10 wherein said slidable wall comprises opposite first and second ends, said first end having a cavity and a spring disposed within said cavity, said spring engaging an end of the channel to spring bias said slidable wall to a home position wherein said magnet is coincident with adjoining apertures in the carrier.

13. The carrier of claim 12 further comprising an actuator engaging said second end of said slidable wall to move said slidable wall in said channel to selectively displace said magnets from alignment with adjoining apertures.

14. A method for resource-efficient collection of specific seed tissue or structure to enable seed specific analysis comprising:
- singulating seed into a plurality of apertures in a seed carrier;
- retaining seed at a seed position on a slidable wall proximate the aperture;
- removing seed tissue from the seed;
- collecting the seed tissue; and
- moving the slidable wall relative to the aperture for releasing the sampled seed for collection.

15. The method of claim 14 further comprising the step of aligning said seed in said apertures with a magnet disposed within said portion of the wall.

16. The method of claim 14 further comprising the step of docking said seed carrier on a collection manifold for collecting said seed tissue in a collector.

17. The method of claim 16 further comprising the step of indexing said sampled seed portion with said seed tissue in said collector.

18. The method of claim 14 further comprising the step of actuating a mechanism engaging the wall for separating the sampled seed from said portion of the wall to release the sampled seed for collection separate from said seed tissue.

19. An apparatus for high throughput staging of seed and release of seed parts, comprising:
- a seed carrier having a plurality of apertures;
- a pair of adjoining apertures separated by a sliding wall;
- a seed position on the wall; and
- the wall moveable away from between the pair of adjoining apertures to dislodge the seed part or seed from the seed position.

20. The apparatus of claim 19 further comprising an automated positioner having an actuator engaging said sliding wall for moving said wall.

21. The apparatus of claim 19 wherein said seed position further comprises a magnet common to the pair of adjoining apertures.

22. The apparatus of claim 21 wherein said seed has a magnetically active coating on its crown whereby said seed is retained at said seed position by said magnet.

23. A system for singulating, separating, and indexing seed parts of a seed, the system comprising:
- a carrier having a plurality of apertures, wherein adjoining apertures share a seed position and are separated by a slidable wall;
- a manifold having a plurality of conduits, said carrier docking with said manifold, whereby
- said apertures in said carrier align with said conduits in said manifold;
- a collector comprising a plurality of chambers, said collector docked within said manifold whereby said conduits in said manifold are aligned with said chambers in said collector; and a mechanism comprising an actuator engaging the slidable wall carrying said seed positions for dislodging seed or seed tissue from said seed positions for passing through said manifold for collection in said collector.

24. The system of claim 12 wherein said seed position comprises:

a) a permanent magnet;

b) an electromagnet;

c) a vacuum port;

d) an adhesive;

e) an interference fit;

1) a tray; or g) other like means for holding said sampled seed.

25. The system of claim 23 wherein said mechanism comprises:

a) a piston;

b) a manually actuated member;

c) an electrical circuit;

d) a pressure valve; or e) other like means for displacing said wall.

* * * * *

UNITED STATES PATENT AND TRADEMARK OFFICE

CERTIFICATE OF CORRECTION

PATENT NO. : 7,997,415 B2
APPLICATION NO. : 12/545286
DATED : August 16, 2011
INVENTOR(S) : Mongan et al.

It is certified that error appears in the above-identified patent and that said Letters Patent is hereby corrected as shown below:

In the Specifications:

Column 3
Line 46, "geometries" should read --geometrics--.

In the Claims:

Column 15, Claim 24
Line 5, "claim 12" should read --claim 23--.

Signed and Sealed this
Seventh Day of May, 2013

Teresa Stanek Rea
*Acting Director of the United States Patent and Trademark Office*